United States Patent [19]

Löhr et al.

[11] Patent Number: 6,099,774
[45] Date of Patent: Aug. 8, 2000

[54] PROCESS FOR NON-FREE FLOWABLE MOLDING POWDERS OF MODIFIED POLYTETRAFLUOROETHYLENES

[75] Inventors: Gernot Löhr, Burgkirchen; Klaus Hintzer, Kastl; Reinhard Albert Sulzbach, Burghausen, all of Germany

[73] Assignee: Dyneon GmbH, Germany

[21] Appl. No.: 09/054,086

[22] Filed: Apr. 2, 1998

Related U.S. Application Data

[62] Division of application No. 08/771,785, Dec. 20, 1996.

[30] Foreign Application Priority Data

Dec. 21, 1995 [DE] Germany ............... 195 47 907

[51] Int. Cl.[7] .................. B29C 67/02; B29C 67/04
[52] U.S. Cl. ....................... 264/117; 264/127
[58] Field of Search ................. 264/37.21, 117, 264/123, 125, 126, 127

[56] References Cited

U.S. PATENT DOCUMENTS

| | | | |
|---|---|---|---|
| 3,366,615 | 1/1968 | Miller | 260/92.1 |
| 3,855,191 | 12/1974 | Doughty, Jr. et al. | 260/87.5 |
| 4,143,110 | 3/1979 | Morozumi et al. | 264/117 |
| 4,216,265 | 8/1980 | Sulzbach | 428/402 |
| 4,241,137 | 12/1980 | Izumo et al. | 428/402 |
| 4,370,436 | 1/1983 | Nakamura et al. | 524/322 |
| 4,379,900 | 4/1983 | Sulzbach | 526/247 |
| 4,439,385 | 3/1984 | Kuhls et al. | 264/37 |
| 4,774,304 | 9/1988 | Kuhls et al. | 526/247 |
| 5,030,400 | 7/1991 | Danielsen et al. | 264/101 |
| 5,156,343 | 10/1992 | Sueyoshi et al. | 264/127 |
| 5,182,119 | 1/1993 | Edens | 425/222 |
| 5,426,128 | 6/1995 | Burger et al. | 264/127 |

*Primary Examiner*—Angela Ortiz
*Attorney, Agent, or Firm*—James V. Lilly

[57] ABSTRACT

Non-free flowable, non-dusting molding powders with a bulk density of more than 450 g/l are obtained when a suspension polymer of tetrafluoroethylene with a content of 0.01 to 1% by weight of units of at least one perfluoro(alkyl-vinyl) ether is ground to a particle diameter of 10 to 50 μm and agglomerated in water.

5 Claims, No Drawings

PROCESS FOR NON-FREE FLOWABLE MOLDING POWDERS OF MODIFIED POLYTETRAFLUOROETHYLENES

This is a division of Ser. No. 08/771,785 filed Dec. 20, 1996.

DESCRIPTION

The invention relates to non-free flowable (non-pourable) molding powders of a suspension polymer with units of tetrafluoroethylene and 0.01 to 1% by weight, preferably 0.02 to 0.5% by weight, of units of at least one perfluoro (alkyl-vinyl) ether with an alkyl group of 1 to 4 carbon atoms, preferably n-perfluoropropyl, having a bulk density of at least 450 g/l, obtainable by grinding the primary particles to an average particle diameter $d_{50}$ of 10 to 50 µm, preferably 15 to 25 µm, in particular about 20 µm, and reagglomerating these particles in water to give a non-dusting agglomerate having a particle diameter $d_{50}$ of about 30 to about 100 µm, preferably about 40 to about 90 µm.

The invention furthermore relates to a process for the preparation of a non-free flowable, non-dusting molding powder having a bulk density of at least 450 g/l and an agglomerate diameter $d_{50}$ of about 30 to about 100 µm, preferably about 40 to about 90 µm, which comprises grinding a suspension polymer with units of tetrafluoroethylene and 0.01 to 1% by weight of units of at least one perfluoro(alkyl-vinyl) ether with an alkyl group of 1 to 4 carbon atoms to a particle diameter $d_{50}$ of 10 to 50 µm and agglomerating the particles in water.

The invention furthermore relates to the use of the molding powders according to the invention in compression molding.

As is known, polytetrafluoroethylene (PTFE) can be prepared by aqueous free radical polymerization by two different processes, that is to say suspension and emulsion polymerization. These two processes naturally lead to polymers which differ fundamentally in morphological terms. As a consequence, the two processes also require fundamentally different working up and processing methods.

The emulsion polymers comprise largely regular, spherical latex particles having a diameter of about 100 to 300 nm, which are agglomerated by a precipitation process to give a so-called paste powder having an average particle diameter of 400 to 700 µm. The specific surface area of such paste powders is 10 to 25 m²/g. These paste powders are further processed by the so-called paste extrusion process to give liners, tubes, hoses and tapes. The characteristic of paste extrusion is that shaping is carried out by forming a paste of the paste powder with gasoline (benzine) or other liquids which are water-immiscible but wet PTFE, using a paste extruder at far below the melting point of the PTFE. This shaping extrusion is usually followed by sintering at temperatures significantly above the melting point of the PTFE. PTFE emulsion polymers therefore cannot be processed as thermoplastics because of their exceptionally high melt viscosity of up to a few 100 GPas.

PTFE suspension polymers also cannot be processed as thermoplastics because of their high melt viscosity. Special processing techniques based on the method of metallurgical compaction sintering have therefore been developed. For this compaction sintering, the suspension polymer must be converted into a molding powder which can be employed.

For this purpose, the suspension polymer, which is obtained in coarse, irregularly shaped grains having a diameter of up to 1500 µm, is first finely ground to a particle diameter of about 10 to 50 µm, preferably by dry grinding, in particular in an air mill. The ground material is also irregularly shaped. The molding powder thus produced is therefore not free-flowable and cannot be metered adequately for automatic processing by compaction. The bulk density is about 300 to 400 g/l.

This non-free flowable molding powder is chiefly compacted to cylinders or hollow cylinders under pressures of up to about 500 bar. These unsintered preforms (green compacts) are then sintered and commodity articles such as skived films or sealing rings are then produced by mechanical processing. To achieve high-grade final properties, the molding powder must have an adequate deformability during the production of the green compact, so that the primary particles can be packed densely against one another without inclusions of air and the green compact thus has an adequate so-called green strength for further processing.

In addition to being unusable for automatic processing by compaction and the difficulties in reliable filling of molds, the non-free flowable molding powder has the further disadvantage of a low bulk density. This means that larger shaping units are necessary. Another disadvantage is to be seen in the dusting during the production of the green compact. Dusting necessitates greater expenditure on keeping the processing unit clean, since PTFE dust is regarded as toxic, especially in connection with smoking.

There has therefore been no lack of attempts to eliminate the disadvantages mentioned. Thus, processes which render the molding powder free-flowing (pourable) and easier to meter by agglomeration processes have been developed. The known agglomeration processes essentially comprise agglomerating the non-free flowable molding powder to more or less regularly shaped granule grains, the average particle diameter of which is between 100 and 600 µm, by a suitable mechanical treatment in a usually two-phase liquid system (comprising water and a solvent of limited water-miscibility which wets the PTFE, such as gasolines and fluorochlorohydrocarbons). These granule grains are distinguished by a smooth surface and a certain grain stability for their handling and transportation. The free-flowing molding powders thus produced have a high bulk density, usually above 800 g/l, do not dust and accordingly offer considerable advantages over the non-free flowable molding powder.

However, these advantages are at the expense of a significant deterioration in the profile of properties. Thus, the tear strength and dielectric strength are significantly reduced, and the sintered articles have a higher content of voids, that is to say more pores up to so-called "pinholes". The cause of the deterioration in properties is the necessarily poorer compactibility and deformability of the free-flowing powder due to the agglomeration. Thus, for example, the contour lines of the granule grain can be clearly detected in 100 µm thick skived films under a microscope at 20-fold magnification in phase contrast.

The change in properties by granulation of a PTFE molding powder is shown in the following Table 1, the abbreviations here and in the following having the meanings given below:

BD: Bulk density according to DIN 53466 or ISO 12086 in g/l $d_{50}$: Average particle diameter in µm, measured with a laser particle measuring instrument from Sympatec (Clausthal-Zellerfeld, Germany)

TS: Tear strength in N/mm², according to DIN 53457 or ISO 12086, test specimens: strips 15 mm wide EB: Elongation at break in %, determined according to DIN 53457 or ISO 12086

DS: Dielectric strength in kV/mm, according to DIN 53481, measurement arrangement ball (diameter 20 mm)/plate (diameter 50 mm)

TABLE 1

| | | Powder Properties | | Properties of 100 μm skived films | | |
|---|---|---|---|---|---|---|
| | | BD | $d_{50}$ | TS | EB | DS |
| Molding powder, crude | Non-free flowable | 380 | 18 | 42 | 480 | 110 |
| Molding powder, agglomerated | Free-flowable | 830 | 450 | 32 | 360 | 80 |

The deterioration in properties seems inherent to the system, since the particle stability required impedes dense packing of the primary particles and of the granule grains during compaction. This deterioration in properties is also observed during granulation of a molding powder of "modified" PTFE, although to a lesser extent. "Modified" PTFE is understood as meaning a polymer which comprises low contents of comonomers, but in which the main property of the PTFE of not being processable as a thermoplastic is retained. The suspension polymers of tetrafluoroethylene employed according to the invention, with 0.01 to 1% by weight of units of at least one perfluoro(alkyl-vinyl) ether are such "modified" polytetrafluoroethylenes. One characteristic of the modified suspension polymers is their lower melt viscosity by about one to two orders of magnitude, which enables them to be welded, for example, without auxiliaries. Although the lowered melt viscosity leads to a better coalescence of the primary particles during sintering, the disadvantages of agglomeration inherent to the system cannot yet be overcome, as the following Table 2 shows for a suspension polymer with 0.09% by weight of perfluoro (n-propylvinyl) ether.

TABLE 2

| | | Powder Properties | | Properties of 100 μm skived films | | |
|---|---|---|---|---|---|---|
| | | BD | $d_{50}$ | TS | EB | DS |
| Molding powder, crude | Non-free flowable | 400 | 18 | 42 | 660 | 110 |
| Molding powder, agglomerated | Free-flowable | 820 | 450 | 35 | 560 | 85 |

As can be seen from the skived films, the free-flowable molding powder does not lead to the high profile of properties of the non-free flowable molding powder.

There was therefore the object of developing a molding powder which, although it is non-free flowable, offers processing advantages over the known molding powders, in particular a higher bulk density and dust-free handling during production of the green compacts.

This object is achieved according to the invention by subjecting molding powders of modified suspension PTFE which are known per se to mechanical treatment in the presence of water. Granulating auxiliaries such as organic solvents can be omitted here. Volatile emulsifiers, such as the ammonium salt of perfluorooctanoic acid (perfluorocaproic acid), can be added as auxiliaries, but are not necessary. Regular shaping of the granule grain is consciously omitted here.

Granulation in water as a medium is known for non-modified PTFE from U.S. Pat. No. 3,366,615, a free-flowable product being produced.

U.S. Pat. No. 3,855,191 relates to a non-free flowable molding powder of modified PTFE which has been produced with relatively large amounts of fluorinated dispersing agent and then ground under wet conditions to a relatively wide particle size distribution. Such products show an onerous dust development during processing. The possibility of agglomeration in water, organic solvents or a mixture thereof is indeed mentioned, but for the purpose of improving the free-flowing.

An increase in the bulk density can indeed also be achieved by grinding the polymers to an average particle diameter of >50 μm and omitting agglomeration. However, these products also show an onerous dust development. If a product ground to an average particle diameter of >50 μm is agglomerated in the context of the invention, skived films which are visually inhomogeneous are obtained from these. The mechanical properties are also significantly poorer than in the case of products obtained from molding powders according to the invention.

A non-dusting, non-free flowable molding powder of modified suspension PTFE having a high bulk density thus cannot be prepared by the processes known to date, and neither by modifications of the process according to the invention defined above.

The invention is illustrated in more detail in the following examples.

EXAMPLES 1 TO 4

General Experimental Procedure

A finely ground, modified suspension PTFE (as defined below) is introduced, while stirring, into a cylindrical 15 l glass vessel (160×300 mm), fitted with a blade baffle and a 3-blade propeller stirrer and containing 4 l of water, and stirring is continued for 70 minutes. The agglomerated molding powder thus obtained is separated off from the water by sieving and dried at 180° C. in a drying cabinet for 8 hours.

Dusting of the molding powder is evaluated visually by observing the formation of dust from a 500 ml glass bottle half-filled with molding powder when it is turned upside down.

The final properties are measured on skived films. These originated from a cylindrical block weighing 13 kg which was compacted and sintered in a known manner. The granular material is compacted in layers with the starting material in this block. Changes in the final properties during agglomeration can therefore be evaluated better.

The properties of starting molding powders are shown in the following Table 3. For comparison, non-modified PTFE is compared here, as "molding powder A" with a PTFE, as "molding powder B", modified with 0.05% by weight of perfluoro(n-propyl-vinyl) ether. "Molding powder B" is the starting material for the molding powder according to the invention.

TABLE 3

| | Powder Properties | | | Properties of 100 μm skived films | |
|---|---|---|---|---|---|
| | BD | $d_{50}$ | TS | EB | DS |
| Molding powder, A | 355 | 24 | 40 | 460 | 85 |
| Molding powder, B | 400 | 24 | 42.5 | 525 | 103 |

COMPARISON EXAMPLES 1 TO 4

2.5 kg of molding powder A were stirred in 4 l of water at 1000 rpm. Comparison Examples 3 and 4 were carried out in the presence of 4 g of ammonium perfluorocaprylate. Table 4 shows the results.

TABLE 4

| Comparison example | Temperature [° C.] | Powder properties | | Properties of 100 μm skived films | | |
|---|---|---|---|---|---|---|
| | | BD | $d_{50}$ | TS | EB | DS |
| 1 | 45 | 670 | 62 | 40 | 410 | 70 |
| 2 | 25 | 490 | 74 | 41 | 490 | 107 |
| 3 | 45 | 530 | 85 | 39 | 400 | 70 |
| 4 | 25 | 490 | 86 | 39 | 410 | 75 |

The molding powders thus obtained do not dust and are not free-flowable. As shown in comparison with Table 1, the final properties are largely retained, but the skived films are visually inhomogeneous, that is to say they show specks of different transparency. Such films are unacceptable for use.

EXAMPLES 5 TO 10

2.5 kg of molding powder of suspension PTFE modified with 0.05% by weight of perfluoro(n-propyl-vinyl) ether are stirred with 4 l of water at the stirrer speed stated (in rpm). Examples 9 and 10 were carried out in the presence of 4 g of ammonium perfluorocaprylate. Table 5 shows the results.

TABLE 5

| Example | Temperature [° C.] | rpm | Powder properties | | Properties of 100 μm skived films | | |
|---|---|---|---|---|---|---|---|
| | | | BD | $d_{50}$ | TS | EB | DS |
| 5 | 23 | 800 | 530 | 41 | 38.5 | 550 | 106 |
| 6 | 45 | 1200 | 530 | 65 | 40 | 550 | 96 |
| 7 | 45 | 800 | 585 | 64 | 36 | 500 | 85 |
| 8 | 25 | 1000 | 500 | 83 | 42 | 555 | 112 |
| 9 | 25 | 1000 | 450 | 43 | 40 | 540 | 108 |
| 10 | 45 | 1000 | 560 | 70 | 43 | 565 | 99 |

All the agglomerated molding powders mentioned do not dust and have a significantly increased bulk density. The final properties of the skived films are retained compared with the starting material. The films are visually homogeneous and free from pores and therefore of high quality.

EXAMPLES 11 AND 12

A molding powder which has been modified with 0.1% by weight of perfluoro(n-propyl-vinyl) ether was employed here. Stirring was carried out at 1000 rpm. Table 6 shows the results.

TABLE 6

| Example | Temperature [° C.] | Powder properties | | Properties of 100 μm skived films | | |
|---|---|---|---|---|---|---|
| | | BD | $d_{50}$ | TS | EB | DS |
| Starting material | | 420 | 24 | 42 | 660 | 110 |
| 11 | 25 | 555 | 48 | 38.5 | 590 | 101 |
| 12 | 45 | 650 | 67 | 38 | 585 | 99 |

These powders also show the same good properties as the products according to Examples 5 to 10.

What is claimed is:

1. A process for the preparation of a non-free flowable, non-dusting molding powder having a bulk density of at least 450 g/l which comprises grinding a suspension polymer with units of tetrafluoroethylene and 0.01 to 1% by weight of units of at least one perfluoro(alkyl-vinyl) ether with an alkyl group of 1 to 4 carbon atoms to a particle diameter $d_{50}$ of 10 to 50 μm and agglomerating the particles in a medium of water without the presence of organic solvent to give an average agglomerate diameter $d_{50}$ of about 30 to about 100 μm.

2. The process as claimed in claim 1, wherein the polymer contains 0.02 to 0.5% by weight of the ether.

3. The process as claimed in claim 1, wherein the polymer is ground to a particle diameter $d_{50}$ of 15 to 25 μm.

4. The process as claimed in claim 1, wherein an agglomerate diameter of about 40 to about 90 μm is established.

5. A process for compression molding which comprises shaping an article from a molding powder as claimed in claim 1 to form a preform and sintering this preform.

* * * * *